(12) United States Patent
Hoffmann

(10) Patent No.: US 7,874,740 B2
(45) Date of Patent: Jan. 25, 2011

(54) HOUSING FOR OPTICAL WAVEGUIDE FERRULE

(75) Inventor: Rita Hoffmann, Rahden (DE)

(73) Assignee: Harting Electronics GmbH & Co. KG (DE)

( * ) Notice: Subject to any disclaimer, the term of this patent is extended or adjusted under 35 U.S.C. 154(b) by 0 days.

(21) Appl. No.: 12/466,266

(22) Filed: May 14, 2009

(65) Prior Publication Data

US 2009/0290845 A1    Nov. 26, 2009

(30) Foreign Application Priority Data

May 23, 2008    (DE) .................. 20 2008 006 934 U

(51) Int. Cl.
*G02B 6/00* (2006.01)
*G02B 6/36* (2006.01)

(52) U.S. Cl. .............................. 385/78; 385/53; 385/76; 385/77; 385/79; 385/80; 385/81; 385/82; 385/83; 385/84; 385/85; 385/139

(58) Field of Classification Search .................. 385/53, 385/76–85, 139
See application file for complete search history.

(56) References Cited

U.S. PATENT DOCUMENTS

| 4,046,452 | A | | 9/1977 | Cassarly | 328/198 |
| 4,797,123 | A | | 1/1989 | Weber | 439/717 |
| 4,842,363 | A | * | 6/1989 | Margolin et al. | 385/84 |
| 6,146,023 | A | * | 11/2000 | Weigel | 385/55 |
| 2004/0151437 | A1 | * | 8/2004 | Marrs et al. | 385/78 |

FOREIGN PATENT DOCUMENTS

| DE | 34 42 056 | 5/1986 |
| FR | 2 776 844 | 10/1999 |
| GB | 2 295 731 | 6/1996 |

* cited by examiner

*Primary Examiner*—Ryan Lepisto
*Assistant Examiner*—Jerry Blevins
(74) *Attorney, Agent, or Firm*—Hayes Soloway P.C.

(57) ABSTRACT

A housing (10) for an optical waveguide ferrule (12), includes first distance elements (22, 28) being determinative for a distance between two adjacently arranged housings (10) and being formed by formations of the housing (10), the first distance elements (22, 28) being located opposite each other with respect to one of a center axis (M) of the housing (10) and the optical waveguide ferrule (12) arranged in the housing (10), and the first distance elements (22, 28) being formed by a pair of first distance elements of a first type (22) and a second type (28) differing from the first type (22).

16 Claims, 12 Drawing Sheets

HOUSING FOR OPTICAL WAVEGUIDE FERRULE

TECHNICAL FIELD

The present invention relates to a housing for an optical waveguide ferrule. The present invention furthermore relates to a plug housing including a mount for a plurality of housings of an optical waveguide ferrule.

BACKGROUND OF THE INVENTION

The housing is used in particular with an optical plug connector which allows one or more optical waveguides to be coupled to an associated component such as, e.g., an optoelectronic converter or a further optical waveguide. The optical waveguide to be coupled is provided at its end with a ferrule, in most cases made of ceramics or metal, which is precisely received in the housing. The housing is then arranged in the plug housing, which may be inserted into an associated plug connector housing.

In the same way as with electrical plug connections, in the case of optical plug connections a multitude of connections may be established at the same time. To this end, a plurality of optical waveguides may be arranged in a row inside the plug housing, and a plurality of rows of optical waveguides may be arranged one on top of the other. An essential function of the housings accommodating the optical waveguide ferrules within the plug housing consists in precisely determining the distance of the optical waveguides from each other. Only when a precise distance of the optical waveguides or, to put it more precisely, of the end faces of the optical waveguides from each other is ensured, a low-loss optical coupling to the associated component is possible. Different applications involve the use of different grid dimensions here, that is, different distances of the end faces of the optical waveguides from each other. Accordingly, a large number of different housings were required.

The object of the invention consists in providing a housing which allows different grid dimensions to be attained at little expense.

BRIEF SUMMARY OF THE INVENTION

To achieve this object, according to the invention provision is made for a housing for an optical waveguide ferrule, including first distance elements being determinative for a distance between two adjacently arranged housings and being formed by formations of the housing, the first distance elements being located opposite each other with respect to one of a center axis of the housing and the optical waveguide ferrule arranged in the housing, and the first distance elements being formed by a pair of first distance elements of a first type and a second type differing from the first type. The invention is based on the basic idea of obtaining a difference in the distance of the center axes of the housing or of the optical waveguide ferrules arranged therein from one another, solely by differently arranging two housings in the plug housing. In this way, one and the same housing may be employed in plug connections involving different grid dimensions. The larger number of units made possible thereby results in lower manufacturing costs.

According to an embodiment of the invention, provision is made that the first distance elements of the first and second types are formed by sections of the housing, the sections having different distances from the center axis of the housing. This allows the grid dimension obtained for housings located side by side to be changed simply in that the housings are arranged with different orientations in relation to each other.

According to an embodiment of the invention, provision is made that the first distance elements of the first type are formed by a supporting surface and the first distance elements of the second type are formed by a recess. In this connection, a recess is understood to mean a depression in a surface determined by the neighboring structure and depending on whether the recess has a bottom, as is the case with a groove, for example, or does not have a bottom, as is the case with a cutout in a wall, for example. This formation of the distance elements allows the different types of distance elements to be manufactured at little expense. In addition, with this formation the housings may be arranged at a distance from each other that is smaller than the width of the housings. This is due to the fact that the supporting surface of one housing may be received in the recess of the neighboring housing.

Provision may be made here that the first distance elements of the first type are formed by a web connecting two side pieces of the housing with each other, and that the first distance elements of the second type are formed by a recess between two webs connecting the two side pieces with each other. This results in an especially compact design.

According to a preferred embodiment of the invention, provision is made that the housing includes a plurality of pairs of the first distance elements which succeed each other alternately oriented along the longitudinal axis. The use of a plurality of alternately oriented pairs of distance elements improves the accuracy with which the housings are arranged relative to each other. In addition, the housings are interlocked without loadings parallel to the center axis, i.e. they can be mutually supported.

According to a preferred embodiment, provision is made for second distance elements which are offset from the first distance elements in a peripheral direction with respect to the center axis, the second distance elements being formed by a pair of second distance elements of a first type and a second type differing from the first type. The use of the second distance elements allows an even greater number of different grid dimensions to be realized with one and the same housing.

According to one embodiment, provision is made that the housing is provided with a locking member which is adapted to lock an optical waveguide ferrule and a compression spring inside the housing. The locking member may be simply applied to the housing from outside, so that assembly of the optical waveguide ferrule in the housing is possible with minimum effort.

Preferably, provision is made for the locking member to include at least one latching ring which can snap into place behind a web of the housing. In this configuration, the locking member automatically snaps into place in the housing when it is pressed into the latter. This results in minimum expense for assembly.

Preferably, provision is made that the housing is made of plastics. This allows the housing with the distance elements to be produced at low cost by means of an injection molding method, for example. In this way, the necessary precision may also be achieved at little expense.

According to the invention, further provided is a plug housing having a mount for a plurality of housings, the housings being received in the plug housing so as to rest against each other. Depending on the orientation of the housings relative to each other within the plug housing, the plug housing allows different grid dimensions to be realized with little effort.

DETAILED DESCRIPTION OF THE PREFERRED EMBODIMENTS

Figure 1:
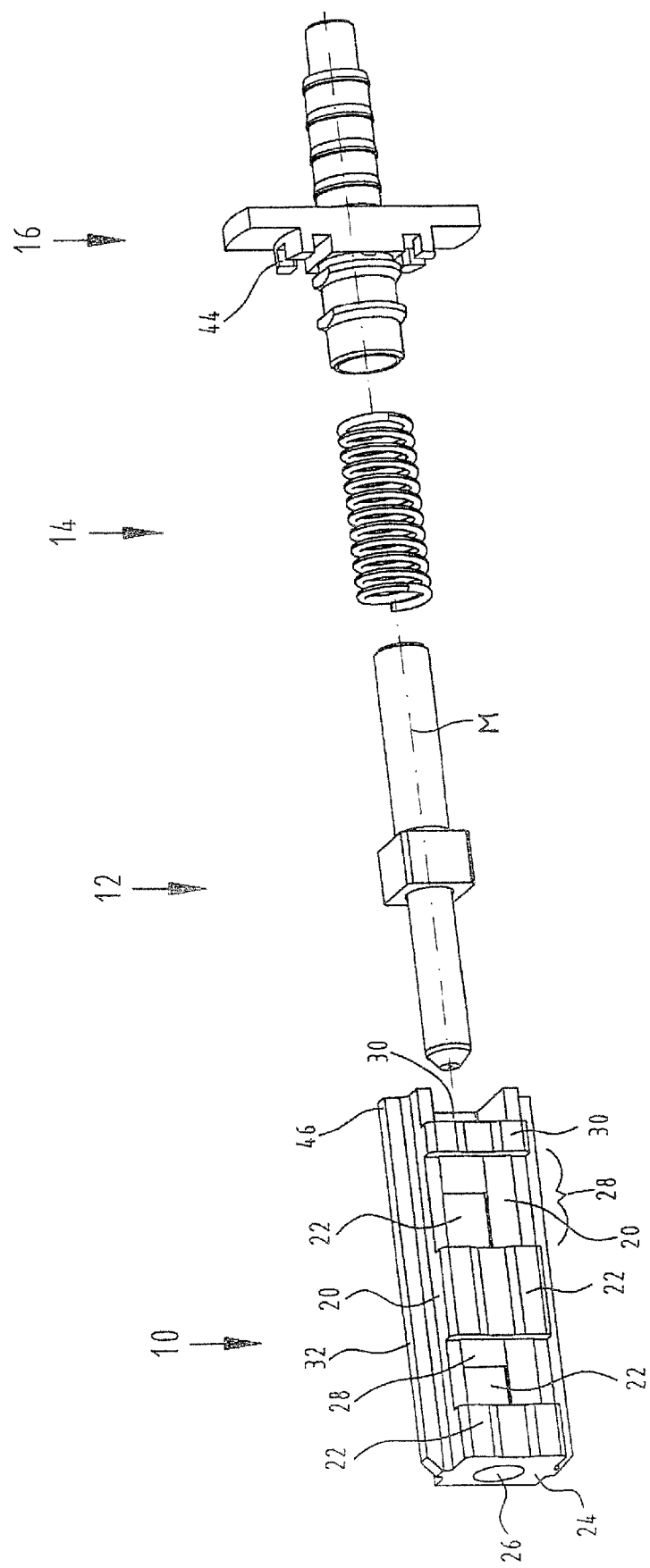
FIG. 1 shows a housing with an optical waveguide ferrule according to a first embodiment in a perspective exploded view.

FIG. 1 shows a housing 10 which is provided to receive an optical waveguide ferrule 12. A compression spring 14 and a locking member 16 are provided to secure the optical waveguide ferrule 12 inside the housing.

The housing 10 includes two wall-type side pieces 20 which are opposite and parallel to one another, and a plurality of webs 22 which connect the two side pieces 20 at the longitudinal edges thereof and which extend at right angles to the two side pieces 20. Provided on an end face of the side pieces 20 is an end wall 24 having an opening 26 formed therein. The optical waveguide ferrule projects outwards from the housing 10 through this opening.

The webs 22 are arranged alternately so that, when viewed along the center axis of the optical waveguide ferrule 12, they do not overlap each other. In other words, there is only one web on each radial plane of the longitudinal axis, either on the "front side" or on the "back side", based on the illustration of FIG. 1. Starting from the end wall 24, the first web 22 is arranged on the front side. On the "rear side", to be seen in FIG. 2, no web is provided adjacent to the end wall 24. With reference to FIG. 1 again, the somewhat wider web 22 arranged on the "rear side" can be seen; opposite to this web a recess 28 is arranged on the front side. This is again followed by a web 22 on the front side, opposite to which a recess 28 is located on the rear side. Adjoining this is a further web 22 on the rear side, a recess 28 being arranged opposite thereto on the front side. Finally, disposed at the end of the housing 10 facing away from the end wall 24 are two smallish locking tabs 30 which are arranged offset from each other in the same way as the webs 22, that is, one on the "front side" and one on the "rear side", offset in relation thereto.

The locking member 16 is provided with a first latching ring 40 and a second latching ring 42, which are arranged one behind the other. The first latching ring 40 snaps into place behind the locking tab 30 that is arranged closer to the middle of the housing (see FIG. 2), i.e. the locking tab arranged on the "front side" in FIG. 1, while the second latching ring 42 snaps into place behind the locking tab 30 that is arranged further outwards, i.e. the locking tab arranged on the "rear side" in FIG. 1. In addition, the locking member 16 is provided with a pair of positioning slots 44 for engagement therein by a pair of positioning ribs 46 formed on the side pieces 20 of the housing 10. The latching rings 40, 42 make sure that the locking member 16 snaps into place on the housing 10 in the axial direction, so that the compression spring is pretensioned and the ferrule 12 is elastically urged against the end wall 24 from inside. The positioning slots 44 and the positioning ribs 46 ensure that the locking member 16 is positioned in the peripheral direction.

The webs 22 and the locking tabs 30 together with the recesses 28 constitute first distance elements, which are determinative for the distance between two adjacently arranged housings. The webs 22 may be considered to be distance elements of a first type here, and the recesses 28 may be considered to be first distance elements of a second type. The two types of distance elements differ in particular in their distance from the center axis of the housing or from the optical waveguide ferrule 12.

Figure 2:
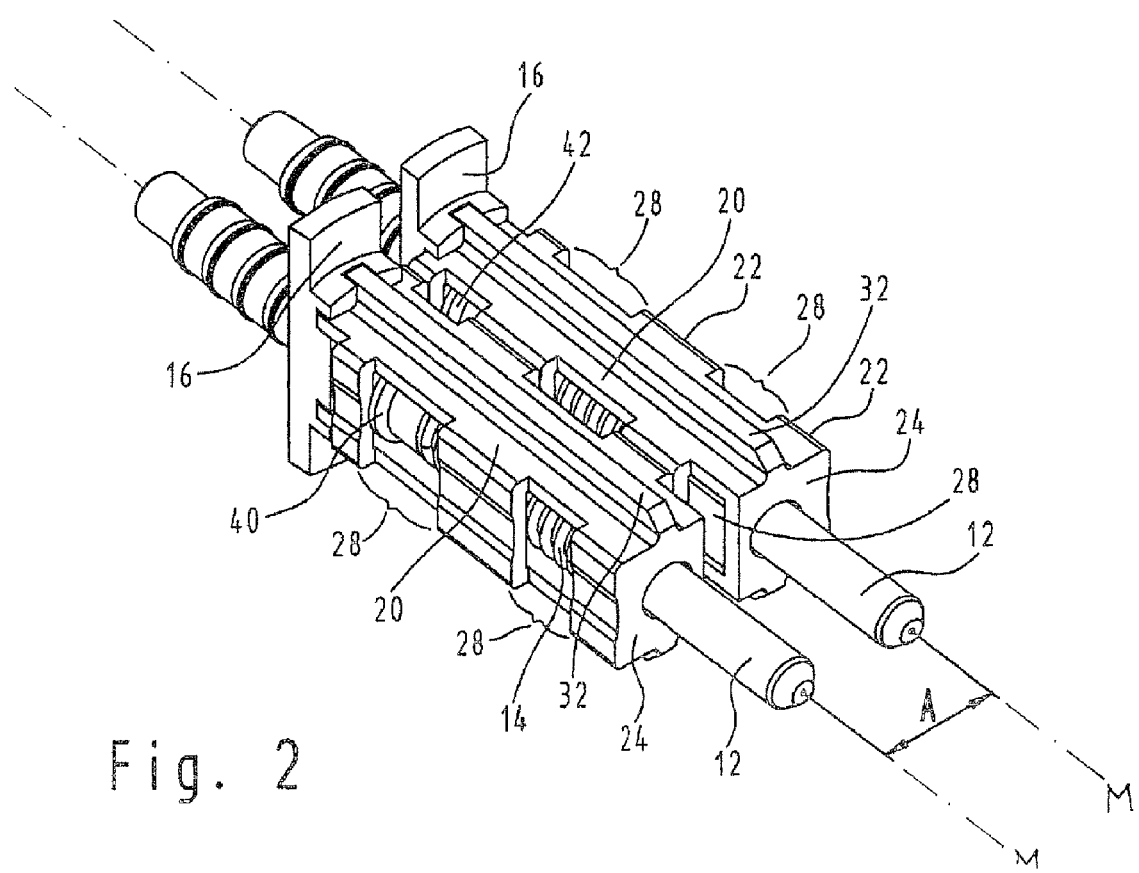
FIG. 2 shows two housings of the first embodiment, arranged in a first grid dimension, in a perspective view.

The functioning of the first distance elements 22, 28 will be explained below with reference to FIGS. 2 and 3. In FIG. 2, two housings are shown to lie side by side, the housings being arranged in different orientations. This is apparent, for example, from the orientation of the first web 22 adjacent to the end wall 24. In the housing shown on the left in FIG. 2, the front web 22 points to the left while in the right-hand housing 10 it points to the right. As a consequence of the different orientations of the housings 10, the housings lying side by side contact each other by means of the webs 22. This also applies to any further housings (not illustrated in FIG. 2), which are arranged to the right and left of the two housings 10 shown.

Figure 3:
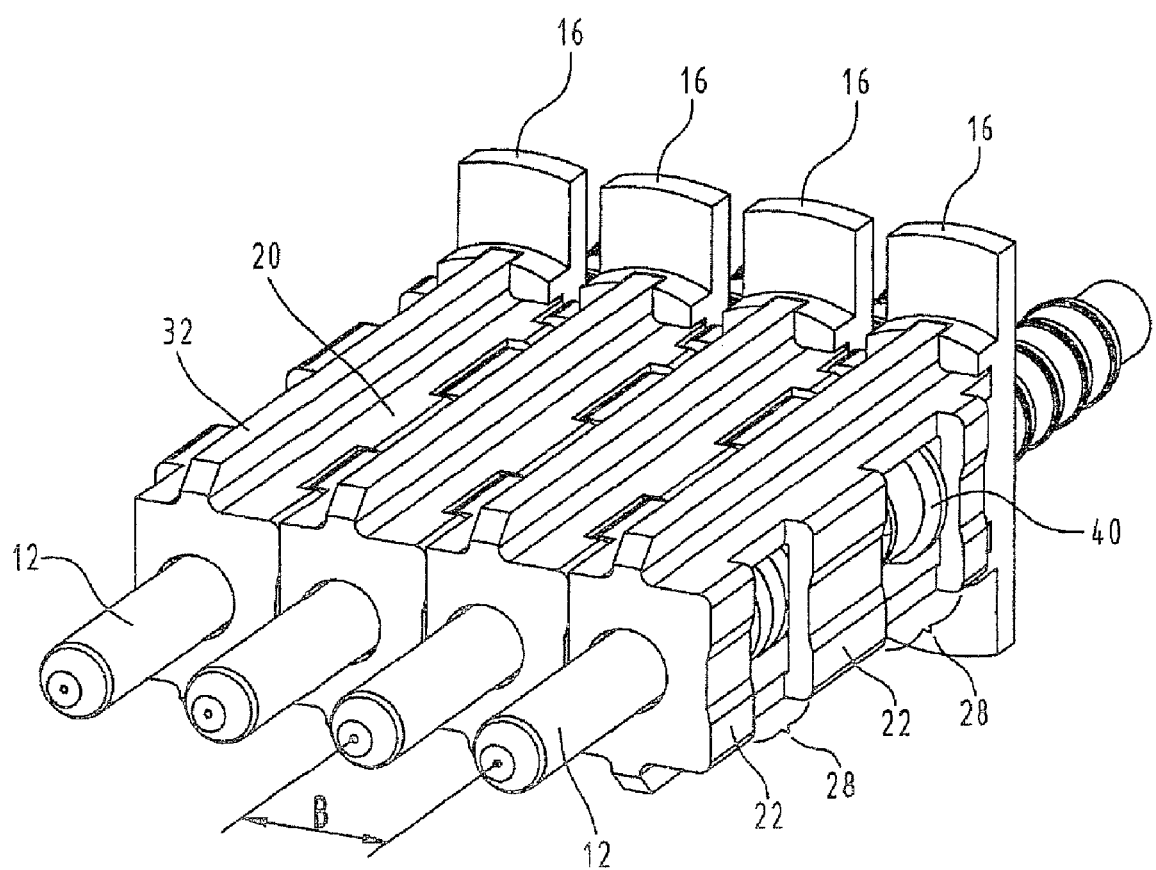
FIG. 3 shows a plurality of housings according to the first embodiment, arranged in a second grid dimension, in a perspective view.
Figure 4:
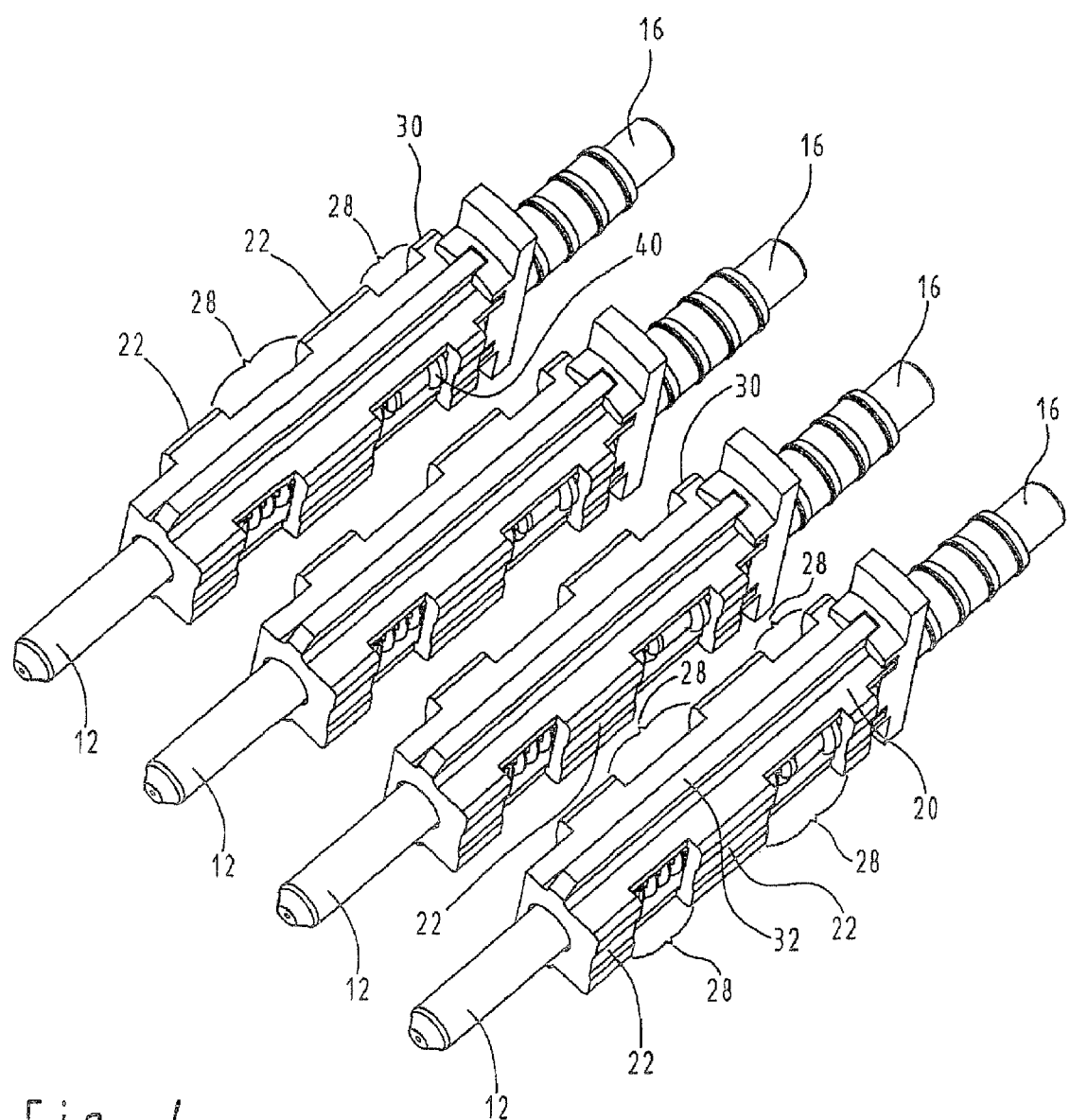
FIG. 4 shows an exploded view of the housings of FIG. 3.
Figure 5:
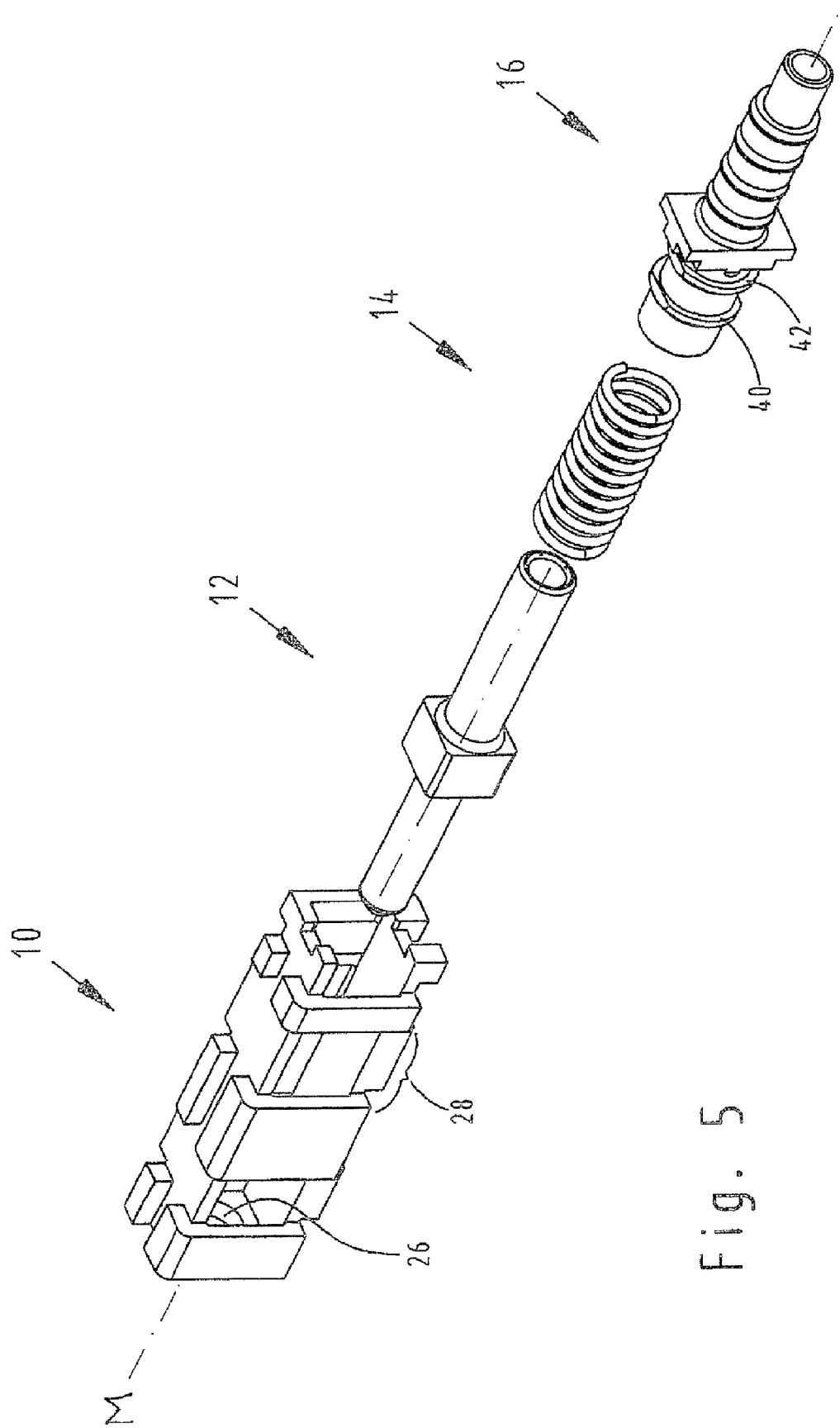
FIG. 5 shows a housing with an optical waveguide ferrule according to a second embodiment in a perspective exploded view.
Figure 6:
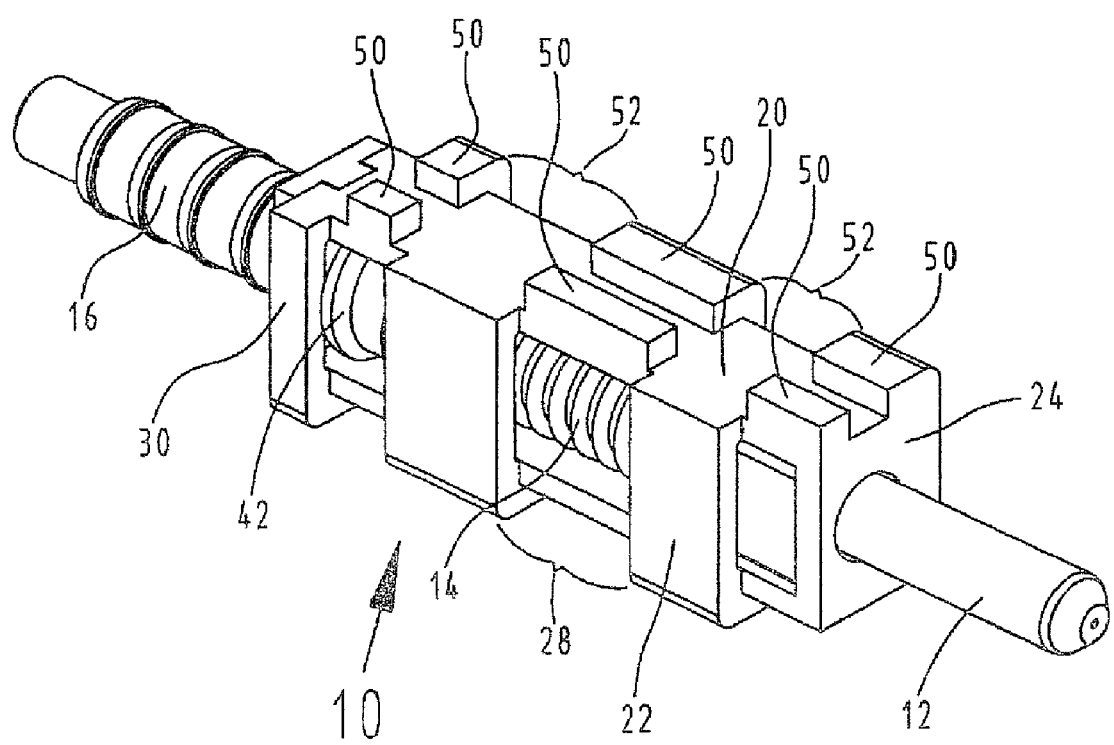
FIG. 6 shows a perspective view of the housing of FIG. 5, with an optical waveguide ferrule mounted therein.

FIG. 3 shows a plurality of housings arranged side by side, with all of the housings having the same orientation. As can be seen in FIG. 3 and even better in FIG. 4, the first web 22, adjacent to the end wall 24, of each housing 10 is oriented to the right. The result is that the webs 22 and locking tabs 30 of one housing lie within the recesses 28 of the neighboring housing. Since the outer surfaces of the webs 22, which serve as supporting surfaces, have a greater distance from the center axis of the housing or of the optical waveguide ferrule 12 than the outer edge of the side pieces 20 in the area of the recesses 28, a distance of the longitudinal axes from each other is obtained with the alternating orientation of the housings 10 as shown in FIG. 2 that is greater than that with the identical orientation of the housings 10 as shown in FIG. 3. For example, with the orientation shown in FIG. 2, a grid dimension of 3 mm may be obtained, that is, a distance A between the longitudinal axes of the optical waveguide ferrules 12, whereas with the orientation shown in FIG. 3 a distance B of 2.5 mm is obtained.

A particular advantage of this configuration of the housings is that a grid dimension may be attained which is smaller than the width of the housings. The reason for this is that portions of one housing may be accommodated in the recesses of the neighboring housing.

What is decisive is that solely by a change of orientation of the housings, in this case specifically by a rotation of the housings through 180° about the longitudinal axis, a transition from one grid dimension to the other is achieved. The housings, disposed side by side, may then be inserted into a plug housing (not shown here), in which they are precisely guided, for example by longitudinal ribs 32.

With reference to FIGS. 5 to 12, a second embodiment of the housings will be described below. The components known from the first embodiment will be denoted by the same reference numerals, and reference is made in this respect to the explanations above.

The housings of the second embodiment are intended to be arranged not only side by side in a row, but in a plurality of rows on top of each other. For this purpose, the locking member 16 is modified to the effect that it does not protrude beyond the respective housing in the lateral direction.

The most relevant difference between the housings of the first embodiment and the housings of the second embodiment resides in that in addition to the first distance elements, second distance elements are also provided, which are arranged on those two sides of the housing 10 that are located between the sides on which the first distance elements 22, 28 are arranged. The second distance elements are thus situated in the region of the side pieces 20.

Similar to the first distance elements of the first and second types, a first type of the second distance elements is formed by a supporting surface which, as a result of additional material, is situated at a larger distance from the center axis of the optical waveguide ferrule 12 than the second distance elements of the second type. Specifically, in the second embodiment the second distance elements of the first type are formed by supporting blocks 50 which are arranged on the side pieces 20 and each have an outer surface constituting the supporting surface with respect to the neighboring housing. Assigned to these second distance elements of the first type are second distance elements of the second type on the opposite side of the housing, which in the present case are formed by portions of the side pieces 20. The supporting blocks 50 of the second distance elements thus correspond to the webs 22 of the first distance elements, and the exposed portions of the side pieces 20 of the second distance elements correspond to the recesses 28 of the first distance elements. In the case of the second distance elements, too, the supporting blocks 50 and the exposed sections 52 of the side pieces 20 are arranged so as to alternate, so that they do not overlap each other.

Figure 7:
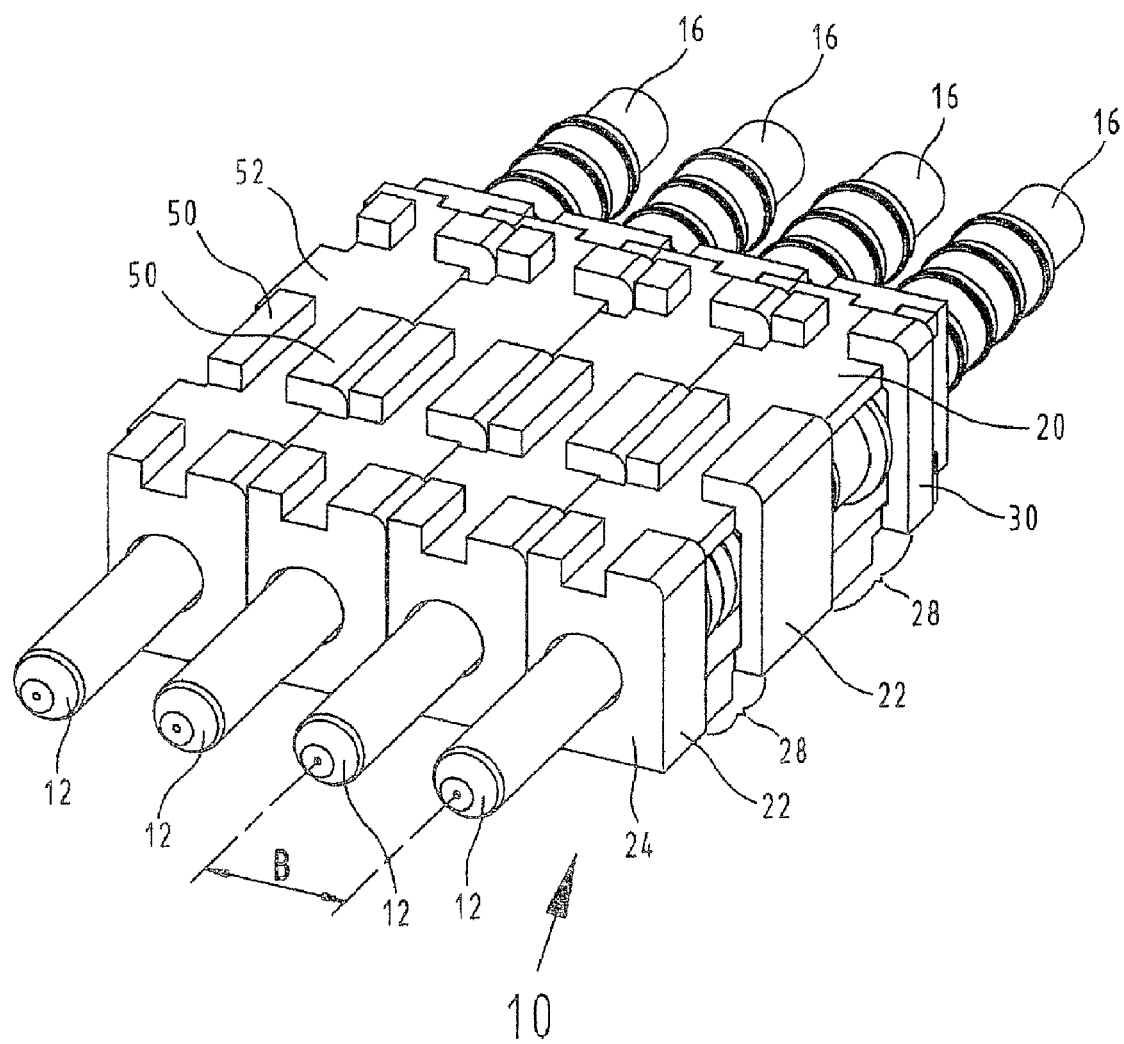
FIG. 7 shows a plurality of housings according to the second embodiment, arranged in a first grid dimension, in a perspective view.
Figure 8:
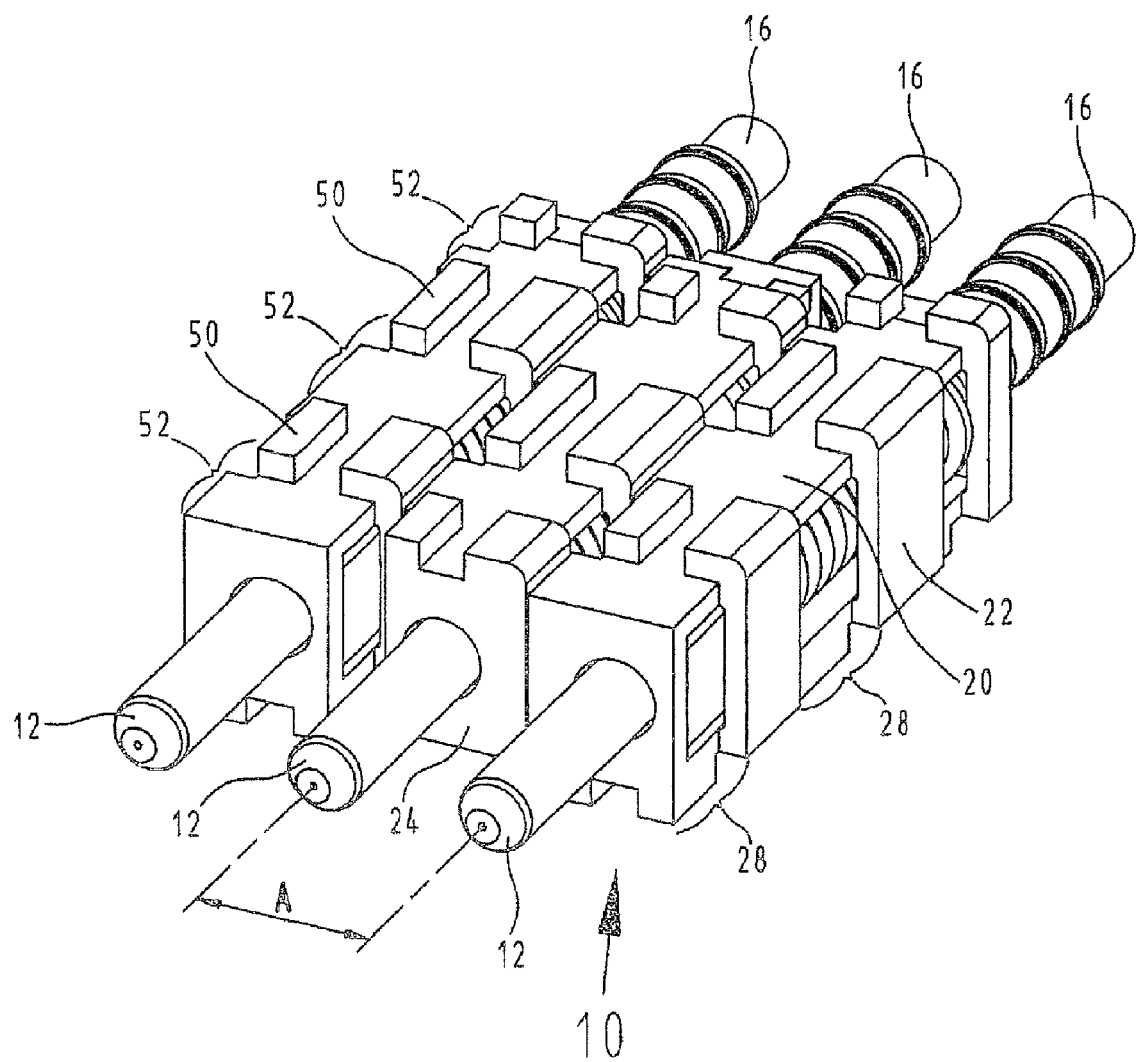
FIG. 8 shows a plurality of housings according to the second embodiment lying side by side, arranged in a second grid dimension, in a perspective view.

Owing to the first distance elements, i.e. the webs 22 and the recesses 28, the housings 10 of the second embodiment may also be arranged with a first grid dimension A (see FIG. 8) and a second grid dimension B (see FIG. 7). Since the second distance elements, formed by the supporting blocks 50 and the exposed sections 52 of the side pieces 20, are provided additionally, the housings 10 may still further be arranged with a third grid dimension C (see FIG. 9) and a fourth grid dimension D (see FIG. 10). When the housings 10 are arranged with the third grid dimension C, for example 3.5 mm, the housings, as related to the second distance elements, are all oriented in the same direction. For example, the supporting blocks 50 arranged at the front end, adjacent to the end wall 24, are all oriented in the same direction, specifically to the left in FIG. 9. As a result, the supporting blocks 50 of one housing are opposite to the exposed sections 52 of the side piece 20 of the neighboring housing. This means that the housings are arranged closely next to each other since the supporting blocks fit into the oppositely located "recesses".

Figure 9:
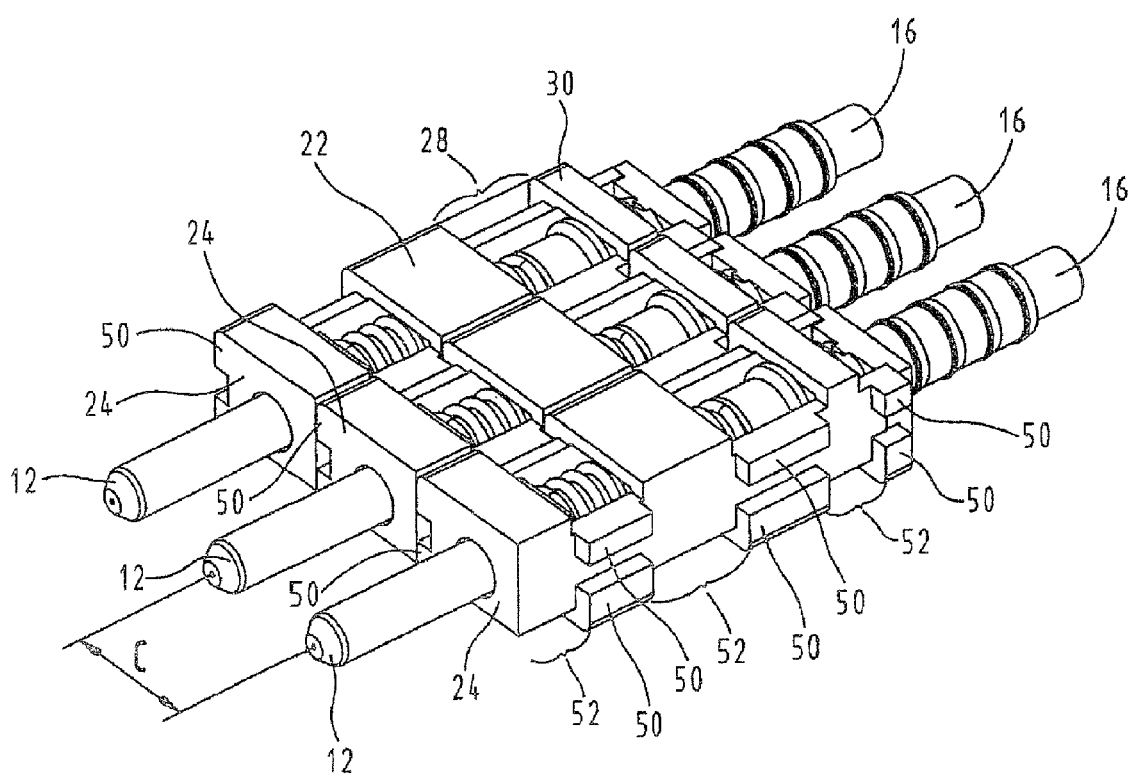
FIG. 9 shows a plurality of housings according to the second embodiment lying side by side, arranged in a third grid dimension, in a perspective view.
Figure 10:
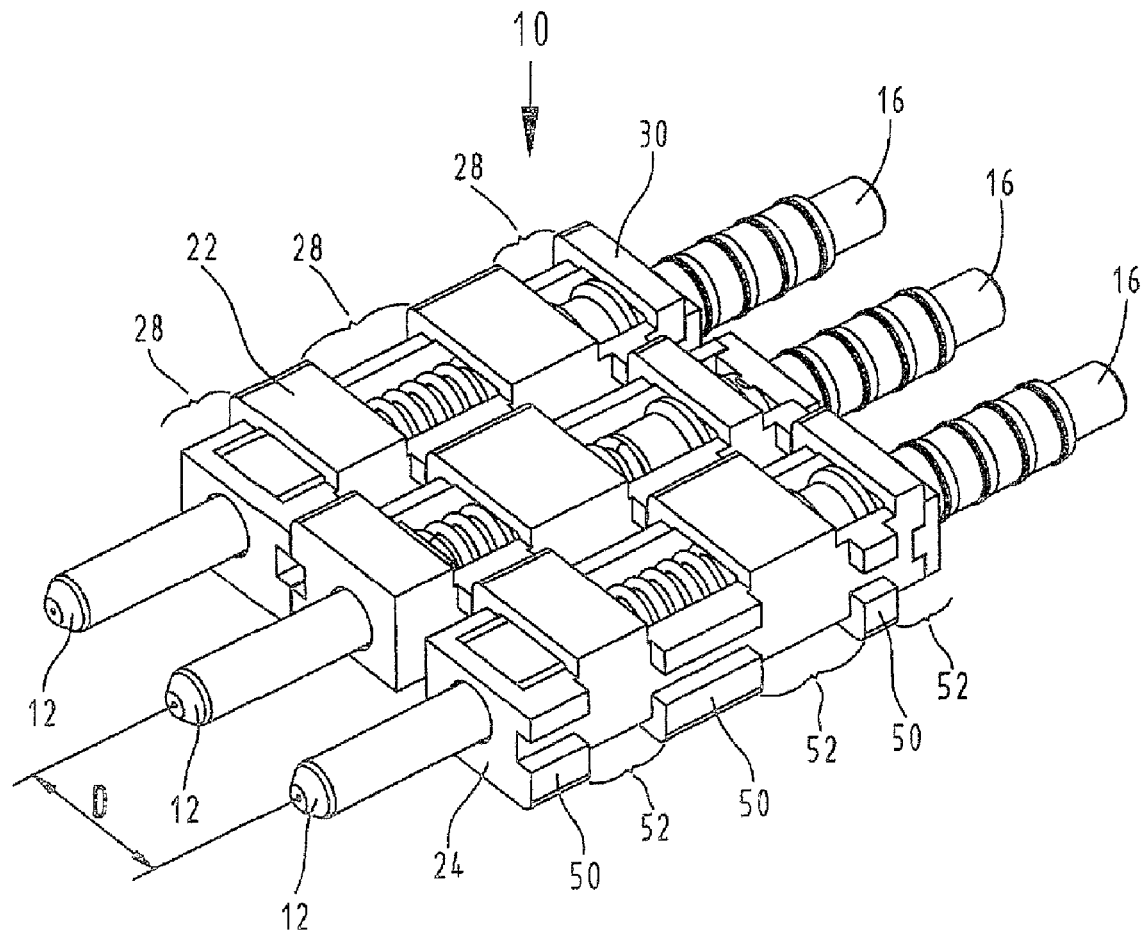
FIG. 10 shows a plurality of housings according to the second embodiment lying side by side, arranged in a fourth grid dimension, in a perspective view.

On the other hand, when the housings 10 are arranged in opposite directions, that is, every other housing is rotated as compared to the orientation shown in FIG. 9, the supporting blocks 50 of one housing are located facing the supporting blocks 50 of the neighboring housing (see FIG. 10). The supporting blocks 50 therefore cause the housings as a whole to be at a greater distance from each other.

Figure 11:
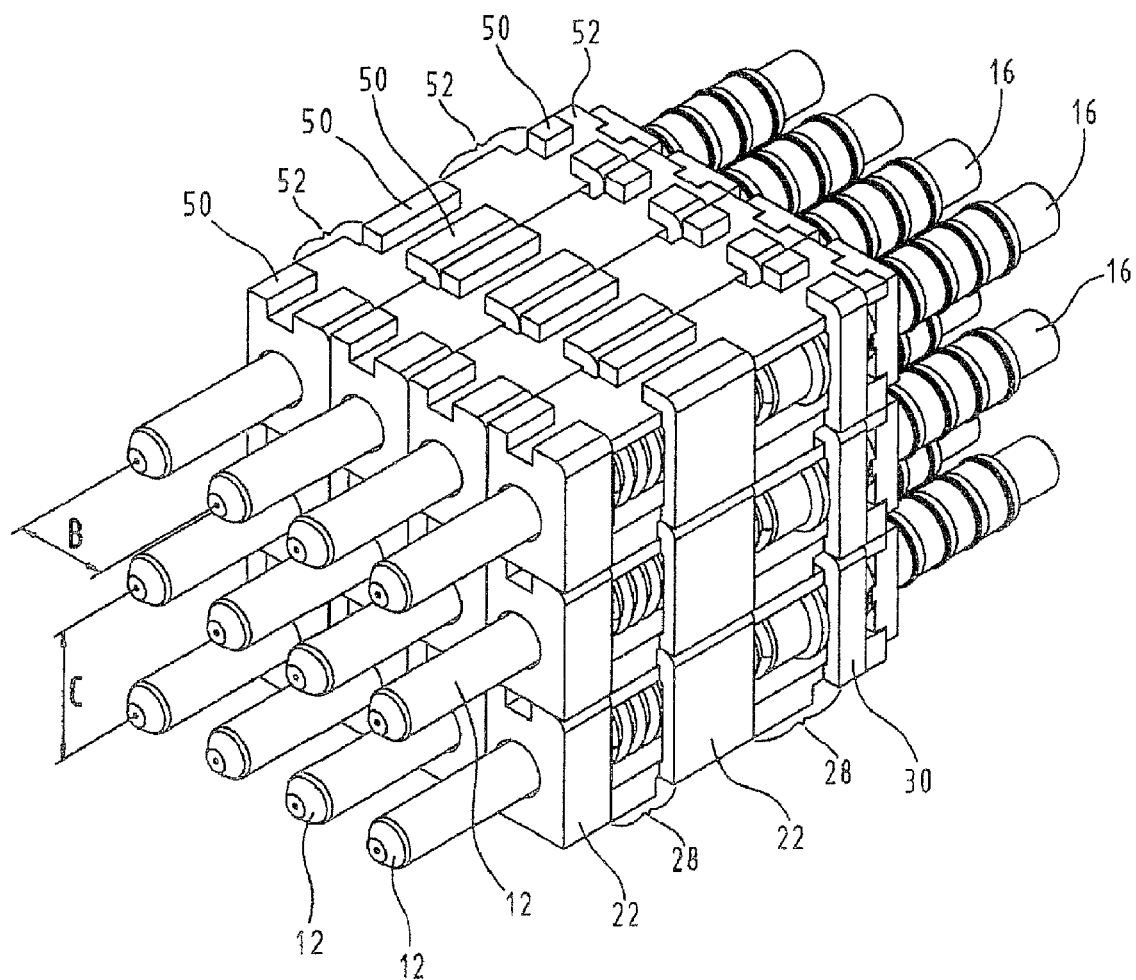
FIG. 11 shows a package of housings according to the second embodiment, which are arranged in a first and a third grid dimension.

As can be seen in FIG. 11, the housings 10 may not only be arranged side by side, but also one on top of the other. This results in different grid dimensions. In the arrangement shown in FIG. 11, the housings are compactly stacked with the smallest grid dimension each, that is, in such a way that the webs 22 engage into the recesses 28 and the supporting blocks 50 engage into the exposed sections 52 of the side pieces 20, As a result, a grid dimension B is obtained in one direction, in this case in the rows, while the grid dimension C is obtained in the other direction, in this case in the column direction. But when the orientation of every other housing is changed, namely, by rotation about the center axis M of the optical waveguide ferrule 12, different grid dimensions are obtained.

Figure 12:
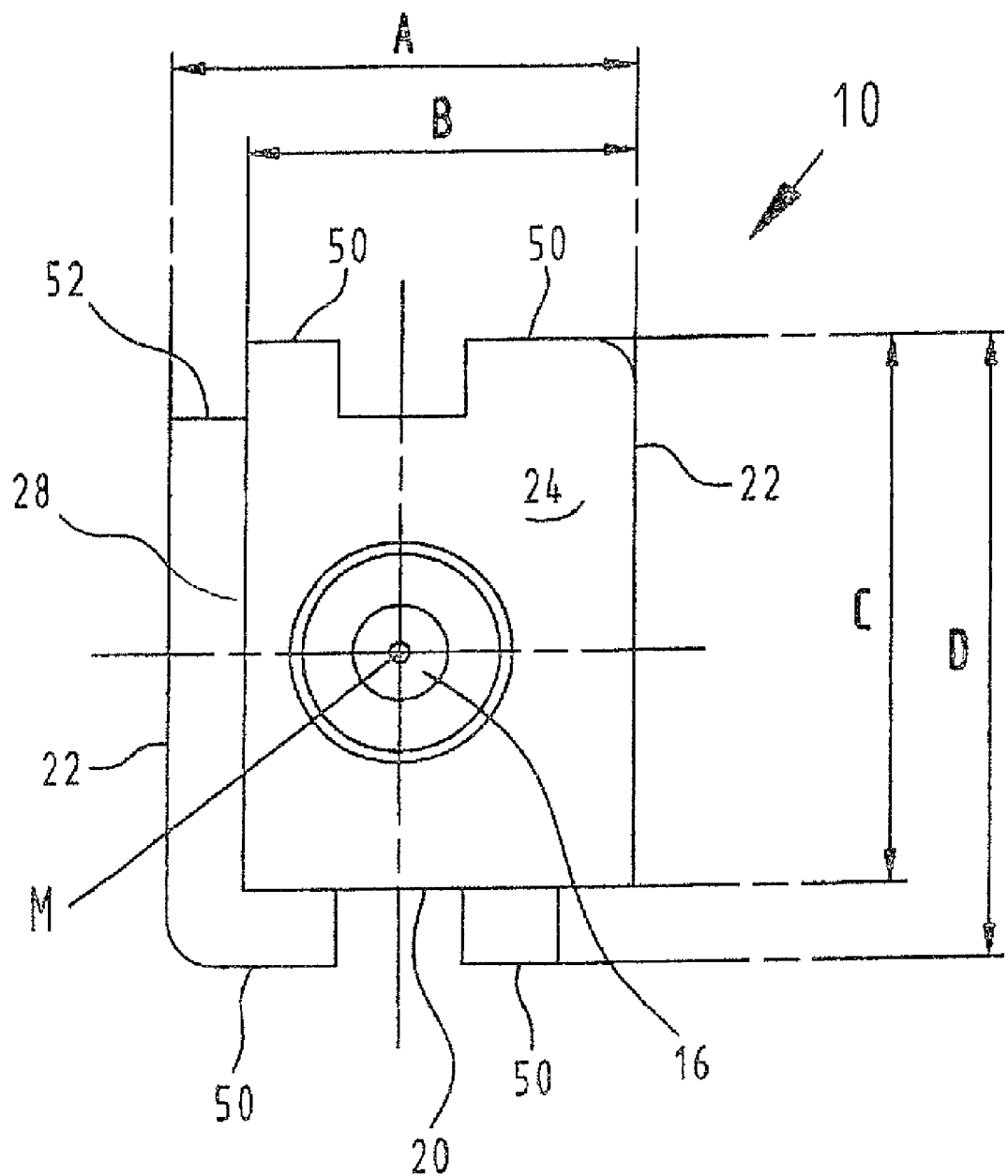
FIG. 12 shows a schematic front view of a housing according to the second embodiment.

FIG. 12 schematically shows a housing according to the second embodiment in a front view. The two different distance elements which are determinative for the respective grid dimensions can be clearly seen in profile. In generalized terms, the housing may be understood as being composed of rectangular sections, the sections being alternately shifted in relation to each other. The section at the very front, which is adjacent to the end wall 24, is determined by the supporting blocks 50 located at the top, the web 22 located on the right-hand side, the side piece 20 arranged on the lower side, and the recess 28 arranged on the left-hand side. This section corresponds to the section at the very front of the housing as visible in FIG. 6. It is adjoined towards the rear by a section which, in relation to the first section, is offset obliquely towards the bottom left. This section is determined by the web 22 on the left-hand side, the section 52 of the side piece 20 that is exposed at the top surface, the recess 28 (not visible in FIG. 12) on the right-hand side, and the supporting blocks 50 on the lower side. This, in turn, is adjoined towards the rear by a third section, the profile of which is congruent with the first section. The third section is followed by a fourth section, which is congruent with the second section. This configuration of the housing allows a different grid dimension to be set by a rotation through 90° in the peripheral direction.

The invention claimed is:

1. A housing for an optical waveguide ferrule, comprising first distance elements being determinative for the distance between two adjacently arranged housings and being formed by formations of the housing, the first distance elements being located opposite each other with respect to one of a center axis of the housing and the optical waveguide ferrule arranged in the housing, and the first distance elements being formed by a pair of first distance elements of a first type and a second type differing from the first type, wherein:

the first distance elements of the first type have a greater distance from the center axis than the first distance elements of the second type, the first distance elements of a pair are located opposite each other in the axial direction, as related to the center axis of the housing, and the housing includes a plurality of pairs of the first distance elements which succeed each other alternately oriented along a longitudinal axis, and a plurality of pairs of the second distance elements which succeed each other alternatively oriented along the longitudinal axis, wherein two adjacent housings are arranged in a first orientation with their respective first distance elements of the first type opposing each other and being thus determinative for the distance between the center axes of the optical waveguide ferrules, and wherein said two adjacent housings are arranged in a second orientation with their respective first distance elements of the first type opposing respective first distance elements of the second type and being thus determinative for the distance between the center axes of the optical waveguide ferrules.

2. The housing according to claim 1, wherein the first distance elements of the first and second types are formed by sections of the housing, the sections having different distances from the center axis of the housing.

3. The housing according to claim 1, wherein the first distance elements of the first type are formed by a supporting surface and the first distance elements of the second type are formed by a recess.

4. The housing according to claim 1, wherein the first distance elements of the first type are formed by a web connecting two side pieces of the housing with each other, and in that the first distance elements of the second type are formed by a recess between two webs connecting the two side pieces with each other.

5. The housing according to claim 4, wherein the side pieces each have a guide rib provided thereon.

6. The housing according to claim 1, wherein second distance elements are provided which are offset from the first distance elements in a peripheral direction with respect to the center axis, the second distance elements being formed by a pair of second distance elements of a first type and a second type differing from the first type.

7. The housing according to claim 6, wherein the second distance elements of the first and second types are formed by sections of the housing, the sections having different distances from the center axis of the housing.

8. The housing according to claim 6, wherein the second distance elements of the first type have a greater distance from the center axis than the second distance elements of the second type.

9. A housing for an optical waveguide ferrule according to claim 1, the housing having a generally rectangular shape and, when viewed from the front to the rear, being formed of a plurality of sections of a rectangular shape which are arranged one behind the other, each section being offset from the section respectively arranged one of in front of and behind it in a direction that is oriented obliquely to the planes defined by side face.

10. The housing according to claim 1, wherein the housing is provided with a locking member which is adapted to lock an optical waveguide ferrule and a compression spring inside the housing.

11. The housing according to claim 10, wherein the locking member includes at least one latching ring which can snap into place behind a web of the housing.

12. The housing according to claim 11, wherein the locking member includes two latching rings one of which snaps into place behind a web that is assigned to a first side face, and a second one of which snaps into place behind a web that is assigned to a second side face, the second side face adjoining the first side face.

13. The housing according to claim 1, wherein the housing is made of a plastic.

14. A plug housing comprising a mount for a plurality of housings according to claim 1, the housings being received in the plug housing so as to rest against each other.

15. A housing for an optical waveguide ferrule, comprising first distance elements being determinative for the distance between two adjacently arranged housings and being formed by formations of the housing, the first distance elements being located opposite each other with respect to one of a center axis of the housing and the optical waveguide ferrule arranged in the housing, and the first distance elements being formed by a pair of first distance elements of a first type and a second type differing from the first type, wherein second distance elements are provided which are offset from the first distance elements in a peripheral direction with respect to the center axis, the second distance elements being formed by a pair of second distance elements of a first type and a second type differing from the first type, and wherein the housing includes a plurality of pairs of the second distance elements which succeed each other alternately oriented along a longitudinal axis.

16. A housing for an optical waveguide ferrule, comprising first distance elements being determinative for the distance between two adjacently arranged housings and being formed by formations of the housing, the first distance elements being located opposite each other with respect to one of a center axis of the housing and the optical waveguide ferrule arranged in the housing, and the first distance elements being formed by a pair of first distance elements of a first type and a second type differing from the first type, wherein the housing is provided with a locking member which is adapted to lock an optical waveguide ferrule and a compression spring inside the housing, wherein the locking member includes at least one latching ring which can snap into place behind a web of the housing, and wherein the locking member includes two latching rings one of which snaps into place behind a web that is assigned to a first side face, and a second one of which snaps into place behind a web that is assigned to a second side face, the second side face adjoining the first side face.

* * * * *